United States Patent
Zhang (12)

(10) Patent No.: US 10,511,547 B2
(45) Date of Patent: *Dec. 17, 2019

(54) MULTICAST DATA PACKET FORWARDING

(71) Applicant: NEW H3C TECHNOLOGIES CO., LTD., Hangzhou (CN)

(72) Inventor: Yang Zhang, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/571,820

(22) PCT Filed: May 4, 2016

(86) PCT No.: PCT/CN2016/080933
§ 371 (c)(1),
(2) Date: Nov. 3, 2017

(87) PCT Pub. No.: WO2016/177315
PCT Pub. Date: Nov. 10, 2016

(65) Prior Publication Data
US 2018/0351879 A1 Dec. 6, 2018

(30) Foreign Application Priority Data
May 4, 2015 (CN) .......................... 2015 1 0220886

(51) Int. Cl.
*H04L 12/931* (2013.01)
*H04L 12/413* (2006.01)
(Continued)

(52) U.S. Cl.
CPC .......... *H04L 49/201* (2013.01); *H04L 12/413* (2013.01); *H04L 12/4641* (2013.01);
(Continued)

(58) Field of Classification Search
CPC ... H04L 49/201; H04L 12/4641; H04L 45/16; H04L 49/25; H04L 2212/00
(Continued)

(56) References Cited

U.S. PATENT DOCUMENTS

| 7,933,268 B1 | 4/2011 | Melman et al. |
| 8,934,501 B2 | 1/2015 | Ramesh |

(Continued)

FOREIGN PATENT DOCUMENTS

| CN | 101094178 A | 12/2007 |
| CN | 102970227 A | 3/2013 |

(Continued)

OTHER PUBLICATIONS

Mahalingam, M. et al., "VXLAN: A Framework for Overlaying Virtualized Layer 2 Networks over Layer 3 Networks," Internet Engineering Task Force Internet Draft, Available Online at https://tools.ietf.org/html/draft-mahalingam-dutt-dcops-vxlan-09, Apr. 10, 2014, 23 pages.

(Continued)

*Primary Examiner* — Christopher R Crompton
(74) *Attorney, Agent, or Firm* — McCoy Russell LLP

(57) ABSTRACT

An I/O board of a VXLAN switch receives a multicast data packet from a VLAN, and sends the multicast data packet to the fabric board of the VXLAN switch when at least one multicast group member port corresponding to the multicast data packet is a first virtual port. The fabric board determines that layer 3 multicast forwarding is to be performed by the fabric board. When a multicast group member port corresponding to the multicast data packet is a VXLAN tunnel port, the fabric board modifies a source MAC address of the multicast data packet, and sends the modified multicast data packet to an I/O board corresponding to the multicast group member port on the VXLAN switch. The I/O board corre- (Continued)

---

101 — the I/O board of the gateway VXLAN switch receives a multicast data packet from a VLAN, when at least one multicast group member port corresponding to the multicast data packet is a first virtual port, the I/O board of the gateway VXLAN switch sends the multicast data packet to the fabric board of the gateway VXLAN switch 102 — the fabric board of the gateway VXLAN switch receives the multicast data packet sent by the I/O board, determines that layer 3 multicast forwarding is to be performed by the fabric board for the multicast data packet. When a multicast group member port corresponding to the multicast data packet is a VXLAN tunnel port, the fabric board may modify a source MAC address of the multicast data packet as a gateway MAC address of the gateway VXLAN switch and send the modified multicast data packet to an I/O board corresponding to the multicast group member port on the VXLAN switch. In some examples, the I/O board corresponding to the multicast group member port on the VXLAN switch is called a matched I/O board 103 — the matched I/O board on the gateway VXLAN switch receives the multicast data packet sent by the fabric board, adds a VXLAN encapsulation to the multicast data packet and forwards the multicast data packet having the VXLAN encapsulation to a VXLAN sponding to the multicast group member port adds a VXLAN encapsulation to the multicast data packet and forwards the multicast data packet having the VXLAN encapsulation to a VXLAN.

15 Claims, 6 Drawing Sheets

(51) Int. Cl.
    *H04L 12/46*         (2006.01)
    *H04L 12/761*       (2013.01)
    *H04L 12/947*       (2013.01)
(52) U.S. Cl.
    CPC .............. *H04L 45/16* (2013.01); *H04L 49/25* (2013.01); *H04L 2212/00* (2013.01)
(58) Field of Classification Search
    USPC ........................................................ 370/390
    See application file for complete search history.

(56) References Cited

U.S. PATENT DOCUMENTS

| | | |
|---|---|---|
| 2003/0210696 A1 | 11/2003 | Goldflam |
| 2013/0329728 A1 | 12/2013 | Ramesh |
| 2014/0192804 A1 | 7/2014 | Ghanwani et al. |
| 2014/0280949 A1* | 9/2014 | Anantharam ....... H04L 67/1008 709/226 |
| 2015/0009992 A1* | 1/2015 | Zhang ................. H04L 49/354 370/392 |
| 2015/0010001 A1 | 1/2015 | Duda et al. |
| 2015/0063353 A1 | 3/2015 | Kapadia et al. |
| 2015/0103839 A1 | 4/2015 | Chandrashekhar et al. |
| 2015/0358232 A1* | 12/2015 | Chen ....................... H04L 45/72 370/392 |

FOREIGN PATENT DOCUMENTS

| | | |
|---|---|---|
| CN | 103095546 A | 5/2013 |
| CN | 103200069 A | 7/2013 |
| CN | 103200085 A | 7/2013 |
| CN | 103259727 A | 8/2013 |
| CN | 103814554 A | 5/2014 |
| CN | 103841023 A | 6/2014 |
| CN | 103873373 A | 6/2014 |
| CN | 104158718 A | 11/2014 |
| CN | 104170331 A | 11/2014 |
| CN | 104350714 A | 2/2015 |
| CN | 104426773 A | 3/2015 |
| EP | 2840736 A2 | 2/2015 |
| EP | 3001609 A1 | 3/2016 |
| JP | 2013526792 A | 6/2013 |
| JP | 2015039135 A | 2/2015 |
| JP | 2015043559 A | 3/2015 |
| JP | 2016082333 A | 5/2016 |
| WO | 03073283 A1 | 9/2003 |
| WO | 2014028094 A1 | 2/2014 |
| WO | 2014032620 A1 | 3/2014 |
| WO | 2014067280 A1 | 5/2014 |
| WO | 2014101394 A1 | 7/2014 |
| WO | 2014205784 A1 | 12/2014 |

OTHER PUBLICATIONS

ISA State Intellectual Property Office of the People's Republic of China, International Search Report Issued in Application No. PCT/CN2016/080934, dated Jul. 4, 2016, WIPO, 3 pages.
ISA State Intellectual Property Office of the People's Republic of China, International Search Report Issued in Application No. PCT/CN2016/080933, dated Jul. 22, 2016, WIPO, 3 pages.
ISA State Intellectual Property Office of the People's Republic of China, International Search Report Issued in Application No. PCT/CN2016/080958, dated Jul. 26, 2016, WIPO, 3 pages.
State Intellectual Property Office of the People's Republic of China, Office Action and Search Report Issued in Application No. 201510221767.1, dated Nov. 26, 2018, 7 pages. (Submitted with Partial Translation).
State Intellectual Property Office of the People's Republic of China, Office Action and Search Report Issued in Application No. 201510223272.2, dated Nov. 30, 2018, 10 pages. (Submitted with Partial Translation).
State Intellectual Property Office of the People's Republic of China, Office Action and Search Report Issued in Application No. 201510220886.5, dated Dec. 5, 2018, 8 pages. (Submitted with Partial Translation).
Nakamura, R. et al., "Ovstack: A Protocol Stack of Common Data Plane for Overlay Networks," Proceedings of the 2014 IEEE Network Operations and Management Symposium (NOMS), May 5, 2014, Krakow, Poland, 8 pages.
Mahalingam, M. et al., "Virtual eXtensible Local Area Network (VXLAN): A Framework for Overlaying Virtualized Layer 2 Networks over Layer 3 Networks," Internet Engineering Task Force, RFC Independent Submission 7348, Aug. 2014, 22 pages.
European Patent Office, Extended European Search Report Issued in Application No. 16789309.8, dated Feb. 2, 2018, Germany, 13 pages.
European Patent Office, Extended European Search Report Issued in Application No. 16789316.3, dated Feb. 5, 2018, Germany, 14 pages.
European Patent Office, Extended European Search Report Issued in Application No. 16789310.6, dated Mar. 19, 2018, Germany, 12 pages.
Japanese Patent Office, Office Action Issued in Application No. 2018-509962, dated Aug. 7, 2018, 7 pages. (Submitted with Machine Translation).
Japanese Patent Office, Office Action Issued in Application No. 2018509958, dated Nov. 6, 2018, 6 pages. (Submitted with Machine Translation).
Japanese Patent Office, Office Action Issued in Application No. 2018-509962, dated Jan. 15, 2019, 4 pages. (Sumitted with Machine Translation).
European Patent Office, Office Action Issued in Application No. 16789310.6, dated Feb. 7, 2019, Germany, 11 pages.
European Patent Office, Office Action Issued in Application No. 16789309.8, dated Feb. 18, 2019, Netherlands, 5 pages.
European Patent Office, Office Action Issued in Application No. 16789316.3, dated Feb. 25, 2019, Netherlands, 8 pages.

* cited by examiner

MULTICAST DATA PACKET FORWARDING

CROSS-REFERENCE TO RELATED APPLICATIONS

The present application is a U.S. National Phase of International Patent Application Serial No. PCT/CN2016/080933, entitled "MULTICAST DATA PACKET FORWARDING", filed on May 4, 2016. International Patent Application Serial No. PCT/CN2016/080933 claims priority to Chinese Patent Application No. 201510220886.5, entitled "Method and apparatus for forwarding a multicast data packet across a VXLAN", filed on May 4, 2015. The entire contents of each of the above-cited applications are hereby incorporated by reference for all purposes.

BACKGROUND

Virtual eXtensible Local Area Network (VXLAN) technologies are layer 2 Virtual Private Network (VPN) technologies based on an Internet Protocol (IP) network and a "Media Access Control (MAC) in User Datagram Protocol (UDP)" encapsulation mode is used. Based on existing service providers or Enterprise IP networks, the VXLAN technologies may provide layer 2 interconnections for spreading physical sites and provide service isolation for different tenants. The VXLAN technologies are mainly used for data center networks.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to.

Generally, a frame-type switch includes a main board, an I/O board and a fabric board. The main board is a single board for implementing calculations of protocol stacks, distribution and control of forwarding entries, and device management. The I/O board is a single board for implementing data packet forwarding, e.g. internal forwarding and external forwarding of data packets. The fabric board is a single board for forwarding data packets and control packets between different boards or different chips within the frame-type switch. The chip on the fabric board has a packet forwarding function and is used to forwarding packets between different I/O boards.

The structure of a VXLAN switch is similar to the structure of the frame switch, and includes a main board, an I/O board and a fabric board. Generally, the number of the I/O boards is greater than 1.

In VXLAN applications, similarly with the frame-type switch, each chip on the fabric board of the VXLAN switch has the packet forwarding function and is used to forwarding packets between different I/O boards.

In some examples, one VXLAN switch is selected as a gateway and improvements are made to implement a layer 3 gateway function of the VXLAN. The selected VXLAN switch is called a gateway VXLAN switch.

The improvements of the gateway VXLAN switch are as follows.

The fabric board of the gateway VXLAN switch adopts chips having a forwarding function and various entry functions. The entry functions include at least a function of receiving and storing an entry distributed by the main board, a function of entry searching, and etc. In some examples, the fabric board may adopt switch chips adopted by the I/O board of the gateway VXLAN switch.

When the fabric board of the gateway VXLAN switch adopts the chips having the forwarding function and the entry functions, layer 3 forwarding of a multicast data packet entering the gateway VXLAN switch may be implemented via cooperation between the I/O board and the fabric board of the gateway VXLAN switch.

Figure 1:
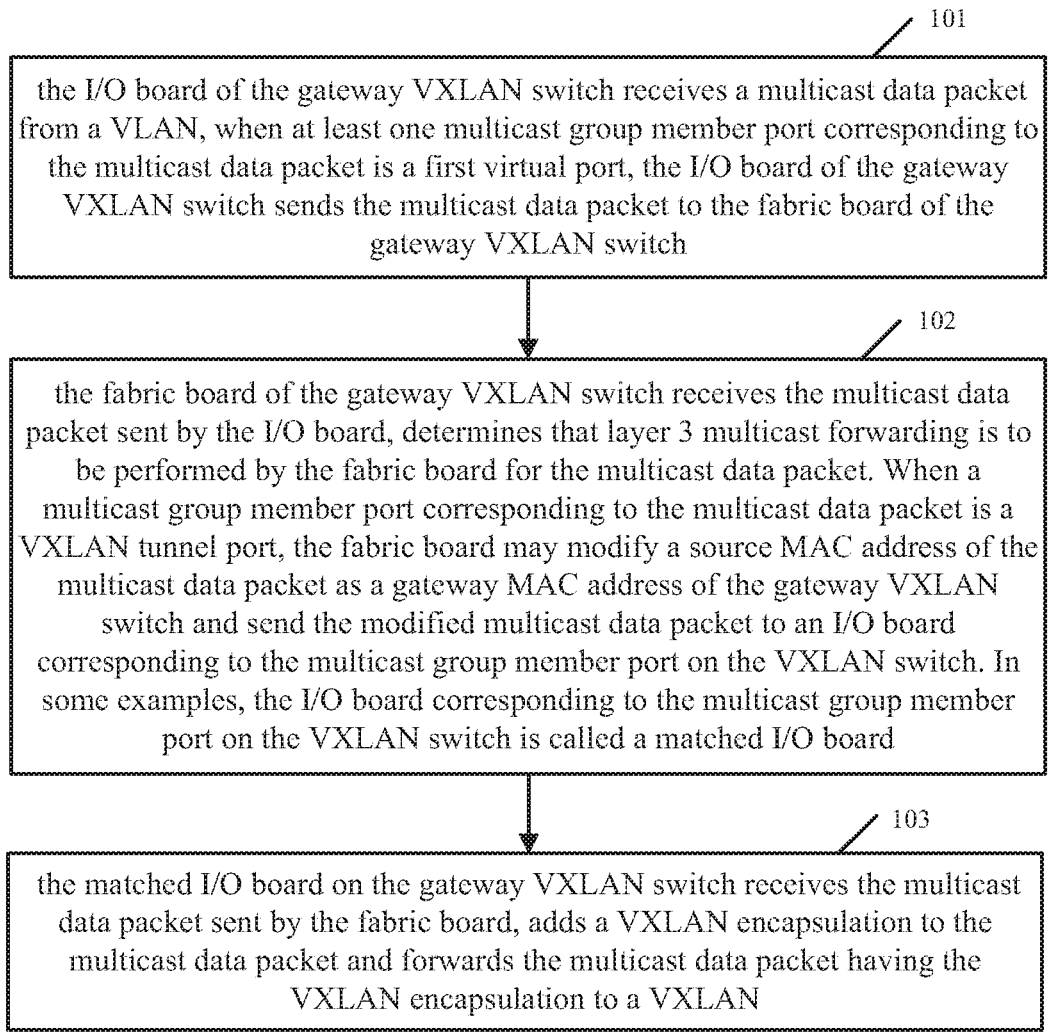
FIG. 1 is a flowchart illustrating a method for forwarding a multicast data packet according to various examples of the present disclosure.

FIG. 1 is a flowchart illustrating a method for forwarding a multicast data packet according to various examples of the present disclosure. The method is applied to a gateway VXLAN switch. In some examples, a fabric board of the gateway VXLAN switch adopts chips having a forwarding function and entry functions, e.g. switch chips adopted by an I/O board. As shown in FIG. 1, the method includes the following blocks.

At block 101, the I/O board of the gateway VXLAN switch receives a multicast data packet from a Virtual Local Area Network (VLAN), when at least one multicast group member port corresponding to the multicast data packet is a first virtual port, the I/O board of the gateway VXLAN switch sends the multicast data packet to the fabric board of the gateway VXLAN switch.

In some examples, the multicast group member port corresponding to the multicast data packet is included in a layer 3 multicast group entry matching with the multicast data packet. At block 101, the I/O board may search a local layer 3 multicast group table for the layer 3 multicast group entry matching with a destination IP (DIP) address and a destination MAC (DMAC) address of the multicast data packet.

In some examples, the local layer 3 multicast group table may be directly configured by the main board.

In some examples, the layer 3 multicast group entry may include more than one multicast group member port. When at least one multicast group member port is the first virtual port, the I/O board may send the multicast data packet to the fabric board of the gateway VXLAN switch. When none of the multicast group member ports is the first virtual port, for example, the multicast group member port may be a VLAN port, the I/O board may perform other processing.

The meanings of the first virtual port will be described thereinafter and will not be described herein.

Figure 2:
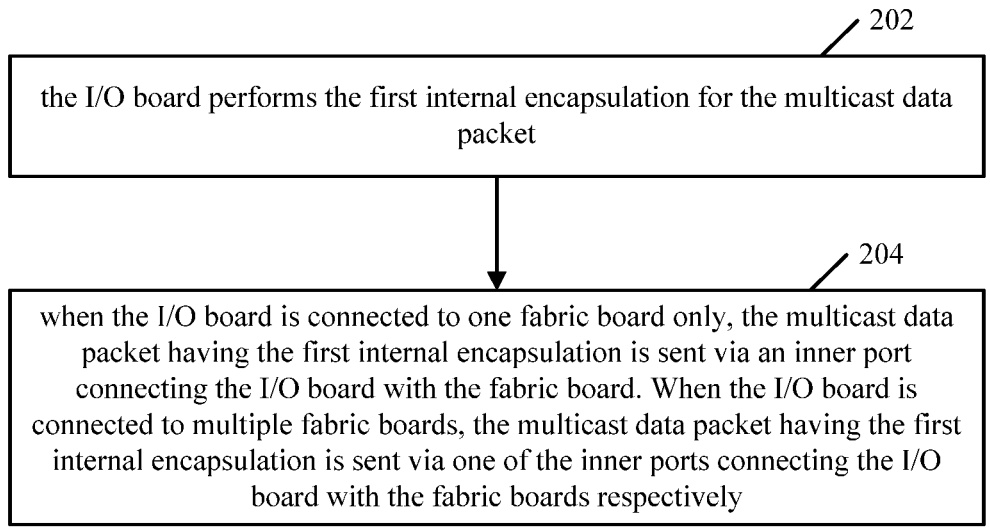
FIG. 2 is a flowchart illustrating a method of sending a multicast data packet to a fabric board according to various examples of the present disclosure.

In some examples, at block 101, the I/O board may add an internal encapsulation to the multicast data packet, so as to ensure that the multicast data packet is sent from the I/O board to the fabric board successfully. The internal encapsulation is called a first internal encapsulation hereinafter. At block 101, the I/O board may perform the following processing as shown in FIG. 2 when sending the multicast data packet to the fabric board of the gateway VXLAN switch.

At block 202, the I/O board adds the first internal encapsulation to the multicast data packet.

In some examples, the first internal encapsulation includes a first destination chip identifier and a first destination port identifier. The first destination chip identifier may be an identifier of a first virtual chip, and the first destination port identifier may be an identifier of a first virtual port.

In some examples, the first virtual chip may be a virtual chip configured in advance for indicting that the fabric board may continue to perform entry searching and multicast data packet forwarding. The first virtual port may be a virtual port configured in advance for indicting that the fabric board may continue to perform entry searching and multicast data packet forwarding.

At block 204, when the I/O board is connected to one fabric board, the multicast data packet having the first internal encapsulation is sent via an inner port connecting the I/O board with the fabric board. When the I/O board is connected to multiple fabric boards, the multicast data packet having the first internal encapsulation is sent via one of the inner ports connecting the I/O board with the fabric boards respectively.

In some examples, when the I/O board is connected to multiple fabric boards, the inner ports connecting the I/O board with the fabric boards respectively may be bound in a logic inner port group. At block 204, when sending the multicast data packet having the first internal encapsulation via one of the inner ports connecting the I/O board with the fabric boards respectively, the I/O board may select one inner port from the inner port group and send the multicast data packet having the first internal encapsulation via the selected inner port. Multiple modes may be used to select one inner port from the inner port group, e.g. selecting the inner port randomly, or selecting the inner port according to a certain algorithm, such as Hash algorithm.

After the processing at blocks 202 and 204 is performed, the multicast data packet having the first internal encapsulation may be received by the fabric board of the gateway VXLAN switch.

At block 102, the fabric board of the gateway VXLAN switch receives the multicast data packet sent by the I/O board, determines that layer 3 multicast forwarding is to be performed by the fabric board for the multicast data packet. When a multicast group member port corresponding to the multicast data packet is a VXLAN tunnel port, the fabric board may modify a source MAC address of the multicast data packet as a gateway MAC address of the gateway VXLAN switch and send the modified multicast data packet to an I/O board corresponding to the multicast group member port on the VXLAN switch. In some examples, the I/O board corresponding to the multicast group member port on the VXLAN switch is called a matched I/O board.

In some examples, the multicast group member port corresponding to the multicast data packet is included in a layer 3 multicast group entry matching with the multicast data packet. At block 204, the fabric board may search a local layer 3 multicast group table for the layer 3 multicast group entry matching with a destination IP address and a destination MAC address of the multicast data packet, so as to determine whether the multicast group member port in the searched-out layer 3 multicast group entry is the VXLAN tunnel port.

In some examples, the layer 3 multicast group entry locally stored by the fabric board may be learned by the main board according to a layer 3 multicast group table learning mode and distributed to the fabric board.

In some examples, the VXLAN tunnel port is a virtual tunnel port and may be indicated by using a VXLAN tunnel encapsulation index. For example, the VXLAN tunnel port may be Tunnel 1 which is the VXLAN tunnel encapsulation index.

In some examples, the layer 3 multicast group entry may include more than one multicast group member port. At block 102, when the number of the multicast group member ports is greater than one, for each multicast group member port, the fabric board may determine whether the multicast group member port is the VXLAN tunnel port. When the multicast group member port is the VXLAN tunnel port, the fabric board may modify the source MAC address of the multicast data packet as the gateway MAC address of the gateway VXLAN switch and send the modified multicast data packet to the matched I/O board. When the multicast group member port is not the VXLAN tunnel port, e.g. a VLAN port, the fabric board may perform other operations which will not described herein.

In some examples, the fabric board may receive one copy of the multicast data packet, and the layer 3 multicast group entry may include more than one multicast group member port. When the number of the multicast group member ports included in the layer 3 multicast group entry is N which is an integer greater than 1, the fabric board may copy the multicast data packet according to the number of the multicast group member ports, and the number of the copied multicast data packet is N−1. The fabric board may distribute the multicast data packet and the copied multicast data packet to the multicast group member ports respectively. Because contents of the multicast data packet and the copied multicast data packet are the same, the copied multicast data packet is called the multicast data packet in some examples. According to the above processing, each multicast group member port may receive one copy of the multicast data packet.

In some examples, based on the first internal encapsulation at block 101, the fabric board may perform the following processing when determining that the layer 3 multicast forwarding is to be performed by the fabric board for the multicast data packet at block 102.

The fabric board may determine the first destination chip identifier and the first destination port identifier from the header of the first internal encapsulation. If the determined first destination chip identifier is the identifier of the first virtual chip, and the first destination port identifier is the identifier of the first virtual port, the fabric board may remove the first internal encapsulation from the multicast data packet having the first internal encapsulation. If the destination MAC address of the multicast data packet is the multicast MAC address and the destination IP address of the multicast data packet is the multicast IP address, the fabric board may determine that the layer 3 multicast forwarding is to be performed by the fabric board for the multicast data packet.

In some examples, if the determined first destination chip identifier is not the identifier of the first virtual chip and/or the first destination port identifier is not the identifier of the first virtual port, the fabric board may forward the multicast data packet according to the first destination port identifier without removing the first internal encapsulation from the multicast data packet having the first internal encapsulation.

Figure 3:
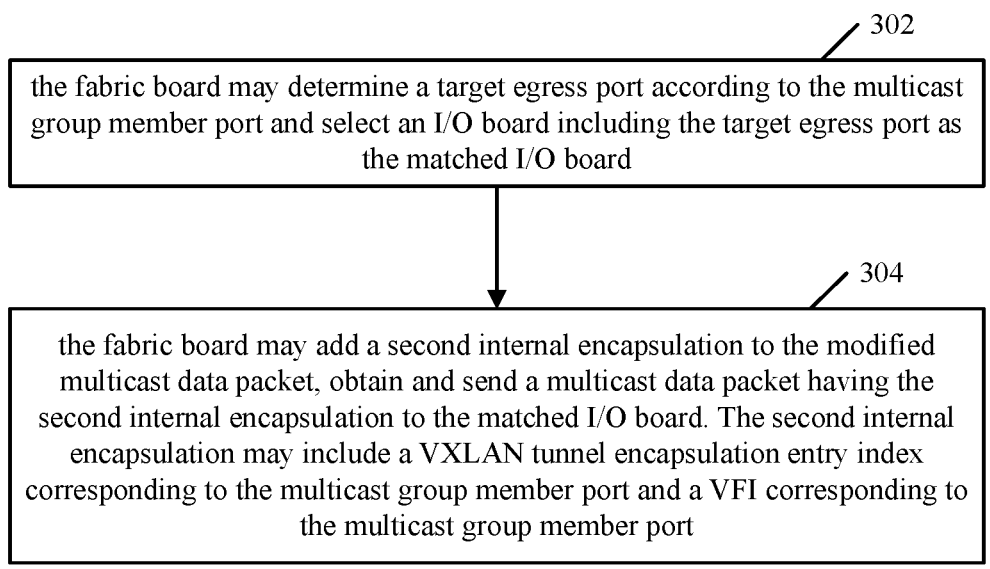
FIG. 3 is a flowchart illustrating a method of sending a multicast data packet to an I/O board according to various examples of the present disclosure.

In some examples, at block 102, the fabric board may perform the following processing as shown in FIG. 3 when sending the modified multicast data packet to the matched I/O board.

At block 302, the fabric board may determine a target egress port according to the multicast group member port and select an I/O board including the target egress port as the matched I/O board.

Figure 4:
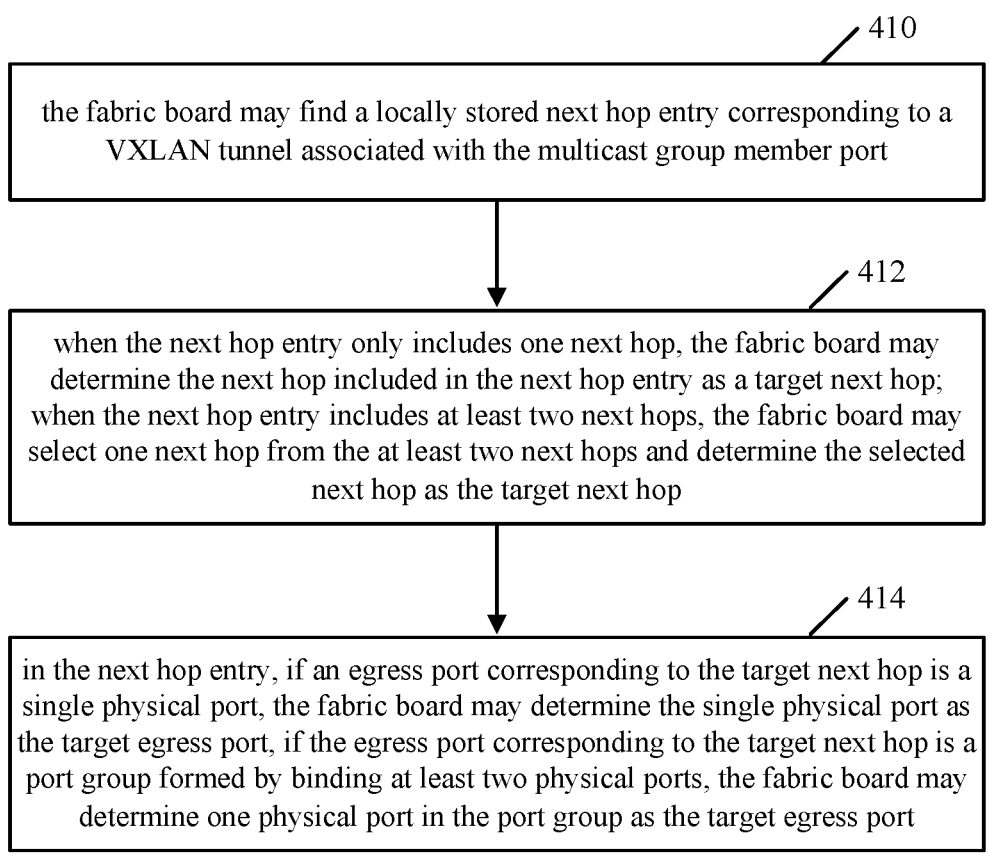
FIG. 4 is a flowchart illustrating a method of determining a target egress port according to various examples of the present disclosure.

In some examples, the fabric board may perform the following processing as shown in FIG. 4 when determining the target egress port according to the multicast group member port.

At block 410, the fabric board may find a locally stored next hop entry corresponding to a VXLAN tunnel associated with the multicast group member port.

At block 412, when the next hop entry includes one next hop, the fabric board may determine the next hop included in the next hop entry as a target next hop; when the next hop entry includes at least two next hops, the fabric board may select one next hop from the at least two next hops and determine the selected next hop as the target next hop. Multiple modes may be used to select the next hop from the at least two next hops, e.g. selecting the next hop randomly, or selecting the next hop according to a certain algorithm, such as Hash algorithm.

At block 414, in the next hop entry, if an egress port corresponding to the target next hop is a single physical port, the fabric board may determine the single physical port as the target egress port, if the egress port corresponding to the target next hop is a port group formed by binding at least two physical ports, the fabric board may determine one physical port in the port group as the target egress port.

The physical port in the port group may be selected from the port group. Multiple modes may be used to select the physical port from the port group, e.g. selecting the physical port randomly, or selecting the physical port according to a certain algorithm, such as Hash algorithm.

At block 304, the fabric board may add a second internal encapsulation to the modified multicast data packet, obtain and send a multicast data packet having the second internal encapsulation to the matched I/O board. The second internal encapsulation may include a VXLAN tunnel encapsulation entry index corresponding to the multicast group member port and a Virtual Forwarding Instance (VFI) corresponding to the multicast group member port.

In some examples, the VXLAN tunnel encapsulation entry index corresponding to the multicast group member port may be stored in a VXLAN tunnel encapsulation entry corresponding to the multicast group member port. The VFI corresponding to the multicast group member port may be stored in a VFI entry corresponding to the multicast group member port.

In some examples, the VXLAN tunnel encapsulation entry and VFI entry may be configured at the fabric board in advance.

According to the descriptions at blocks 302 and 304, the multicast data packet received by the matched I/O board is the multicast data packet having the second internal encapsulation.

At block 103, the matched I/O board on the gateway VXLAN switch receives the multicast data packet sent by the fabric board, adds a VXLAN encapsulation to the multicast data packet and forwards the multicast data packet having the VXLAN encapsulation to a VXLAN.

In some examples, according to the mode used by the fabric board for sending the multicast data packet to the matched I/O board at block 102, the multicast data packet received by the matched I/O board is the multicast data packet having the second internal encapsulation. At block 103, after receiving the multicast data packet having the second internal encapsulation, the matched I/O board may determine the VXLAN tunnel encapsulation entry index and the VFI from a header of the second internal encapsulation, remove the second internal encapsulation from the multicast data packet having the second internal encapsulation, find a locally stored VXLAN tunnel encapsulation entry corresponding to the VXLAN tunnel encapsulation entry index, search a preconfigured mapping relation between the VFIs and the VNIDs for a VNID corresponding to the determined VFI, add the VXLAN encapsulation to the multicast data packet according to the VXLAN tunnel encapsulation entry and the searched-out VNID, and send the multicast data packet having the VXLAN encapsulation via an egress port in the found VXLAN tunnel encapsulation entry.

In some examples, when adding the VXLAN encapsulation to the multicast data packet according to the VXLAN tunnel encapsulation entry and the searched-out VNID, the matched I/O board may add a VXLAN outer layer header to the multicast data packet according to VXLAN tunnel encapsulation information in the VXLAN tunnel encapsulation entry, and add a VXLAN field (e.g. a VNID field) to the multicast data packet according to the found VNID. In some examples, the VXLAN outer layer header at least includes an outer layer ETH encapsulation. The outer layer ETH encapsulation at least includes an outer layer source MAC (SMAC) address, an outer layer destination MAC address (DMAC), an outer layer source IP address (SIP), an outer layer destination IP address (DIP) and etc.

In some examples, when sending the multicast data packet having the VXLAN encapsulation via the egress port in the found VXLAN tunnel encapsulation entry, the following processing may be included. The matched I/O board may identify the egress port from the found VXLAN tunnel encapsulation entry. If the egress port is a single physical port, the matched I/O board may send the multicast data packet having the VXLAN encapsulation via the single physical port. If the egress port is a port group formed by binding at least two physical ports, the matched I/O board may select one physical port from the port group and send the multicast data packet having the VXLAN encapsulation via the selected physical port.

In some examples, the mode used for selecting the physical port from the port group need to ensure that the physical port selected by the matched I/O board is the same as the physical port selected by the fabric board when determining the target egress port. For example, if the Hash algorithm is used by the fabric board to select the physical port, the matched I/O board may select the physical port by using the Hash algorithm.

In some examples, the VXLAN tunnel encapsulation entry stored locally by the matched I/O board may be preconfigured on the matched I/O board.

As can be seen from the processing shown in FIG. 1, according to the examples of the present disclosure, the fabric board of the gateway VXLAN switch may adopt chips having the forwarding function and the entry functions, e.g. the switch chips adopted by the I/O board. After receiving the multicast data packet from the VLAN, the I/O board of the gateway VXLAN switch may search the local layer 3 multicast group table for the layer 3 multicast group entry matching with a destination IP address and a destination MAC address of the multicast data packet, when at least one multicast group member port corresponding to the multicast data packet is a first virtual port, the I/O board may send the multicast data packet to the fabric board of the gateway VXLAN switch. The fabric board of the gateway VXLAN switch may search the local layer 3 multicast group table for the layer 3 multicast group entry matching with the destination IP address and the destination MAC address of the multicast data packet. When the multicast group member port corresponding to the multicast data packet in the layer 3 multicast group entry is the VXLAN tunnel port, the fabric board may modify the source MAC address of the multicast data packet as the gateway MAC address of the gateway VXLAN switch and send the modified multicast data packet to the I/O board corresponding to the multicast group member port on the gateway VXLAN switch. The matched I/O board on the gateway VXLAN switch may add the VXLAN encapsulation to the multicast data packet and forward the multicast data packet having the VXLAN encapsulation to the VXLAN. Hence, the layer 3 gateway function of the VXLAN is implemented by using the gateway VXLAN switch, and the multicast data packet is sent from the VLAN to the VXLAN. In addition, the whole processing is implemented within the gateway VXLAN switch, no bandwidth resources are wasted, and wire speed forwarding of the multicast data packet is implemented.

Figure 5:
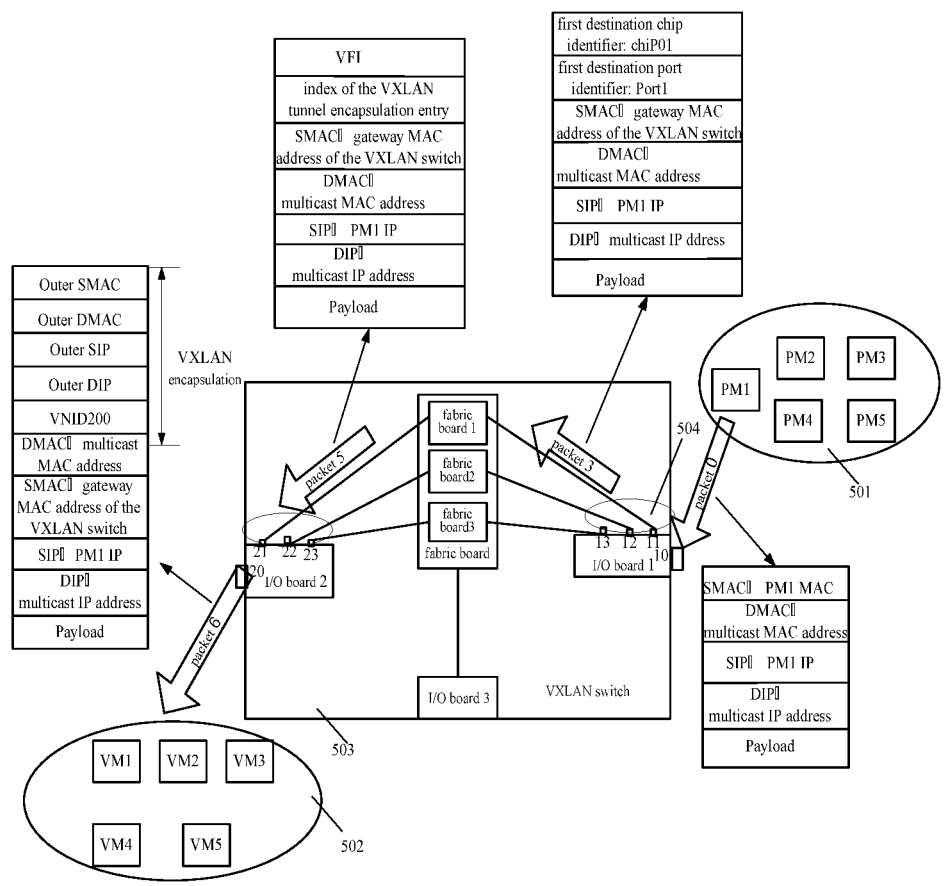
FIG. 5 is a diagram illustrating a networking structure for forwarding a multicast data packet according to various examples of the present disclosure.

The processing shown in FIG. 1 will be described by taking networking shown in FIG. 5 as an example. As shown in FIG. 5, a Physical Machine (PM) PM1, PM2, PM3, PM4 and PM5 are devices in a VLAN 501, a Virtual Machine (VM) VM1, VM2, VM3, VM4 and VM5 are devices in a VXLAN 502, The gateway VXLAN switch 503 is located between the VLAN 501 and the VXLAN 502, and includes I/O boards, fabric boards and a main board which is not shown in FIG. 5. The fabric board adopts the chip having a forwarding function and entry functions, e.g. a switch chip adopted by the I/O board. In the networking shown in FIG. 5, an I/O board 1, I/O board 2, and I/O board 3 are taken as examples.

In the example, the PM1 sending a multicast data packet is taken as an example.

The I/O board 1 of the gateway VXLAN switch 503 may receive a multicast data packet sent by the PM1 via a local port, e.g. a port 10 shown in FIG. 5. In the example, the received multicast data packet is called a packet 0.

The I/O board 1 may discover that a destination MAC address of the packet 0 is a multicast MAC address and a destination IP address of the packet 0 is a multicast IP address, and determine the packet 0 as a multicast data packet.

The I/O board 1 may search a local layer 3 multicast group table for a layer 3 multicast group entry matching with the destination IP address and the destination MAC address of the multicast data packet.

The I/O board 1 may discover that the layer 3 multicast group entry includes 5 multicast group member ports. Three multicast group member ports are the first virtual port, and the other two multicast group member ports are the VLAN port.

Besides the received packet 0, the fabric board 1 may copy two copies of the packet 0. For the three copies of the packet 0, two copies are sent to the two VLAN ports respectively, and one copy is sent to the first virtual port. The packet sent to the first virtual port is called a packet 2 (not shown in FIG. 5).

The I/O board 1 may add a first internal encapsulation to the packet 2. In the first internal encapsulation, the first destination chip identifier is an identifier of a first virtual chip, e.g. chip 01 as shown in FIG. 5, the first destination port identifier is an identifier of a first virtual port, e.g. Port 1 as shown in FIG. 5. In the example, a packet obtained after adding the first internal encapsulation to the packet 2 is called a packet 3.

As shown in FIG. 5, the I/O board 1 is connected to the fabric boards via a port group 504 including an inner port 11, an inner port 12 and an inner port 13. The I/O board 1 may select one inner port from the port group 504, e.g. the port 11, and send the packet 3 to the fabric board 1 via the inner port 11. The mode used by the I/O board 1 for selecting the inner port may be configured in advance. For example, Hash algorithm may be used. In some example, the I/O board 1 may perform Hash calculation of the number of the multicast group member port Port 31, and select an inner port having a number corresponding to a result of the Hash calculation.

The fabric board 1 may receive the packet 3, and determine that the first destination chip identifier and the first destination port identifier in a header of the first internal encapsulation of the packet 3 are chip 01 and Port 1 respectively, i.e. the identifier of the first virtual chip and the identifier of the first virtual port. The fabric board 1 may remove the first internal encapsulation, and the packet 2 is obtained.

The fabric board 1 may determine the destination MAC address of the packet 2 is the multicast MAC address, and the destination IP address of the packet 2 is the multicast IP address, and determine that the fabric board 1 need to perform layer 3 multicast forwarding for the packet 2.

The fabric board 1 may search a local layer 3 multicast group table for a layer 3 multicast group entry matching with the destination IP address and destination MAC address of the packet 2.

The fabric board 1 may discover three multicast group member ports are included in the layer 3 multicast group entry. For example, the three multicast group member ports are represented as Port31, Port32, Port 33, which are not shown in FIG. 5.

The fabric board 1 may copy two copies of the packet 2 which are represented as a packet 21 and a packet 22 (not shown in FIG. 5). The fabric board 1 may distribute the packet 2 and two copies of the packet 2 to the three multicast group member ports. For example, the packet 21 is distributed to the multicast group member Port 31, the packet 22 is distributed to the multicast group member port Port 32, and the packet 2 is distributed to the multicast group member port Port 33.

In the following processing, the multicast group member port Port 31 is taken as an example, and the multicast group member ports Port 32 and Port 33 may be processed accordingly.

In the following processing, the multicast group member port Port 31 is a VXLAN tunnel port, and modify the source MAC address of the packet 21 as a gateway MAC address of the gateway VXLAN switch 503. In the example, the modified packet 21 is called packet 4 (not shown in FIG. 5).

The fabric board 1 may find a locally stored next hop entry corresponding to a VXLAN tunnel associated with the VXLAN tunnel port. After determining that the found next hop entry includes one next hop and an egress port corresponding to the next hop is a port group (not shown in FIG. 5) formed by binding at least two physical ports, the fabric board 1 may select one physical port of the port group as the target egress port, and an I/O board including the selected physical port is the I/O board associated with the multicast group member port Port 31. In the example, the I/O board including the target egress port is the I/O board 2.

The fabric board 1 may find a VXLAN tunnel encapsulation entry corresponding to the multicast group member port Port 31 from locally stored VXLAN tunnel encapsulation entries, and find a VFI entry corresponding to the multicast group member port Port 31 from locally stored VFI entries.

The fabric board 1 may add a second internal encapsulation to the packet 4, and a packet obtained after adding the second internal encapsulation to the packet 4 is called packet 5. The second internal encapsulation may include an index of the VXLAN tunnel encapsulation entry found by the fabric board 1 and VFI included in the VFI entry found by the fabric board 1.

The fabric board 1 may send the packet 5 to the I/O board 2 via an inner port connecting the fabric board 1 and the I/O board 2.

The I/O board 2 may receive the packet 5 sent by the fabric board 1, determine the VXLAN tunnel encapsulation entry and the VFI from a header of the second internal encapsulation, and remove the second internal encapsulation from the packet 5, thus the packet 4 is obtained.

The I/O board 2 may find a locally stored VXLAN tunnel encapsulation entry corresponding to the index of the VXLAN tunnel encapsulation entry, search a preconfigured mapping relation between the VFIs and the VNIDs for a VNID corresponding to the determined VFI, e.g. the VNID 200 as shown in FIG. 5, add a VXLAN encapsulation to the packet 4 according to the found VXLAN tunnel encapsulation entry and the VNID. In the example, a packet obtained after adding the VXLAN encapsulation to the packet 4 is called a packet 6.

In some examples, the I/O board 2 may add the VXLAN encapsulation to the packet 4 according to the following processing. The I/O board 2 may add a VXLAN outer layer header to the packet 4 according to VXLAN tunnel encapsulation information in the VXLAN tunnel encapsulation entry, and add a VXLAN field (e.g. a VNID field) to the packet 4 according to the found VNID, e.g. the VNID 200 as shown in FIG. 5. As shown in FIG. 5, in the VXLAN encapsulation of the packet 6, the VXLAN outer layer header includes an outer ETH encapsulation, and the outer ETH encapsulation includes an outer source MAC address, an outer destination MAC address, an outer source IP address, an outer destination IP address.

The I/O board 2 may send the packet 6 via an egress port in the found VXLAN tunnel encapsulation entry. In some examples, the I/O board 2 may identify the egress port from the found VXLAN tunnel encapsulation entry. The identified egress port is an egress port of a next hop found by the fabric board. As described above, the egress port is a port group formed by binding at least two physical ports, and thus the identified egress port is the port group. The I/O board 2 may select one physical port from the port group according to the mode used by the fabric board for selecting the target egress port, thereby ensuring the port via which the packet 5 is sent is the same as the target egress port selected by the fabric board.

In the example, if the multicast group member associated with the multicast group member port Port 31 is the VM1, the VM1 of the VXLAN will receive the multicast data packet sent by the PM1. Similarly, if the multicast group member associated with the multicast group member port Port 32 is the VM2, the VM2 of the VXLAN will receive the multicast data packet sent by the PM1; if the multicast group member associated with the multicast group member port Port 33 is the VM3, the VM3 of the VXLAN will receive the multicast data packet sent by the PM1. Therefore, the multicast data packet is forwarding from the VLAN 501 to the VXLAN 502 by using the gateway VXLAN switch 503.

Figure 6:
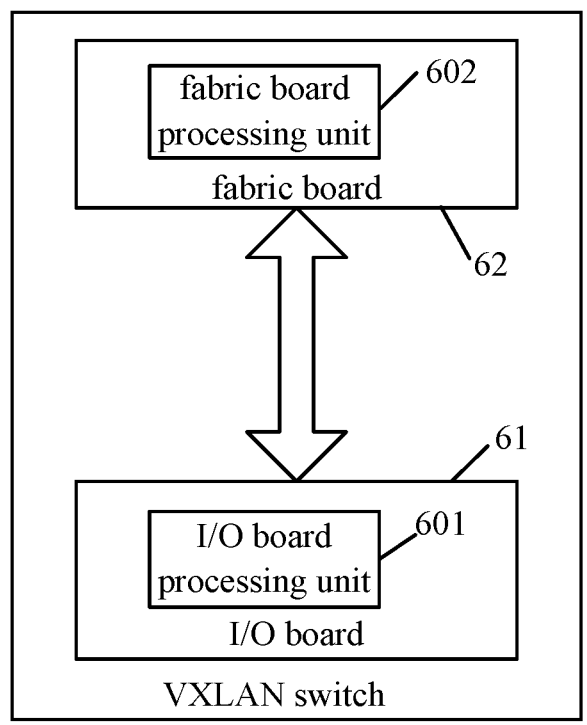
FIG. 6 is a diagram illustrating a VXLAN switch according to various examples of the present disclosure.

FIG. 6 is a diagram illustrating a VXLAN switch according to various examples of the present disclosure. As shown in FIG. 6, the VXLAN switch at least includes an I/O board 61 and a fabric board 62. The fabric board 62 adopts a chip having a forwarding function and entry functions. As shown in FIG. 6, the VXLAN switch includes an I/O board processing unit 601 located at the I/O board 61 and a fabric board processing unit 602 located at the fabric board 62.

The I/O board processing unit 601 is to receive a multicast data packet from a VLAN, when at least one multicast group member port corresponding to the multicast data packet is a first virtual port, send the multicast data packet to the fabric board 62 of the VXLAN switch. The I/O board processing unit 601 is further to receives a multicast data packet sent by the fabric board 62, add a VXLAN encapsulation to the multicast data packet and forwards the multicast data packet having the VXLAN encapsulation to a VXLAN.

The fabric board processing unit 602 is to receive the multicast data packet sent by the I/O board 61, determine that layer 3 multicast forwarding is to be performed by the fabric board 62 for the multicast data packet. When a multicast group member port corresponding to the multicast data packet is a VXLAN tunnel port, the fabric board processing unit 602 is to modify a source MAC address of the multicast data packet as a gateway MAC address of the VXLAN switch and send the modified multicast data packet to an I/O board corresponding to the multicast group member port on the VXLAN switch.

In some examples, the multicast group member port corresponding to the multicast data packet is included in a layer 3 multicast group entry matching with the multicast data packet. The I/O board processing unit 601 is further to search a local layer 3 multicast group table for the layer 3 multicast group entry matching with a destination IP address and a destination MAC address of the multicast data packet. The fabric board processing unit 602 is further to search a local layer 3 multicast group table for the layer 3 multicast group entry matching with a destination IP address and a destination MAC address of the multicast data packet.

In some examples, the I/O board processing unit 601 may send the multicast data packet to the fabric board 62 of the VXLAN switch according to the following processing.

The I/O board processing unit 601 is to add a first internal encapsulation to the multicast data packet. The first internal encapsulation includes a first destination chip identifier and a first destination port identifier. The first destination chip identifier may be an identifier of a first virtual chip, and the first destination port identifier may be an identifier of a first virtual port.

When the I/O board 61 is connected to one fabric board 62, the I/O board processing unit 601 is to send the multicast data packet having the first internal encapsulation via an inner port connecting the I/O board 61 with the fabric board 62. When the I/O board 61 is connected to multiple fabric boards 62, the I/O board processing unit 601 is to send the multicast data packet having the first internal encapsulation via one of the inner ports connecting the I/O board 61 with the fabric boards 62 respectively.

In some examples, the fabric board processing unit 602 may determine that layer 3 multicast forwarding is to be performed by the fabric board 62 for the multicast data packet according to the following processing.

The fabric board processing unit 602 is to determine the first destination chip identifier and the first destination port identifier from the header of the first internal encapsulation. If the determined first destination chip identifier is the identifier of the first virtual chip, and the first destination port identifier is the identifier of the first virtual port, the fabric board processing unit 602 is to remove the first internal encapsulation from the multicast data packet having the first internal encapsulation. If the destination MAC address of the multicast data packet is the multicast MAC address and the destination IP address of the multicast data packet is the multicast IP address, the fabric board processing unit 602 is to determine that layer 3 multicast forwarding is to be performed by the fabric board 62 for the multicast data packet.

In some examples, the fabric board processing unit 602 may send the modified multicast data packet to the I/O board corresponding to the multicast group member port on the VXLAN switch according to the following processing.

The fabric board processing unit 602 is to determine a target egress port according to the multicast group member port and select an I/O board including the target egress port as the matched I/O board, add a second internal encapsulation to the modified multicast data packet, obtain and send a multicast data packet having the second internal encapsulation to the I/O board including the target egress port. The second internal encapsulation may include a VXLAN tunnel encapsulation entry index corresponding to the multicast group member port and a VFI corresponding to the multicast group member port.

In some examples, the I/O board processing unit 601 may add the VXLAN encapsulation to the multicast data packet and forward the multicast data packet having the VXLAN encapsulation to the VXLAN according to the following processing.

The I/O board processing unit 601 is to determine the VXLAN tunnel encapsulation entry index and the VFI from a header of the second internal encapsulation, and remove the second internal encapsulation from the multicast data packet having the second internal encapsulation, find a locally stored VXLAN tunnel encapsulation entry corresponding to the VXLAN tunnel encapsulation entry index, search a preconfigured mapping relation between the VFIs and the VNIDs for a VNID corresponding to the determined VFI, add the VXLAN encapsulation to the multicast data packet according to the VXLAN tunnel encapsulation entry and the searched-out VNID, and send the multicast data packet having the VXLAN encapsulation via an egress port in the found VXLAN tunnel encapsulation entry.

In some examples, the fabric board processing unit 602 may determine the target egress port according to the multicast group member port according to the following processing.

The fabric board processing unit 602 is to find a locally stored next hop entry corresponding to a VXLAN tunnel associated with the multicast group member port.

When the next hop entry includes one next hop, the fabric board processing unit 602 is to determine the next hop included in the next hop entry as a target next hop; when the next hop entry includes at least two next hops, the fabric board processing unit 602 is to select one next hop from the at least two next hops and determine the selected next hop as the target next hop. In the next hop entry, when an egress port corresponding to the target next hop is a single physical port, the fabric board processing unit 602 is to determine the single physical port as the target egress port, when the egress port corresponding to the target next hop is a port group formed by binding at least two physical ports, the fabric board processing unit 602 is to determine one physical port in the port group as the target egress port.

Figure 7:
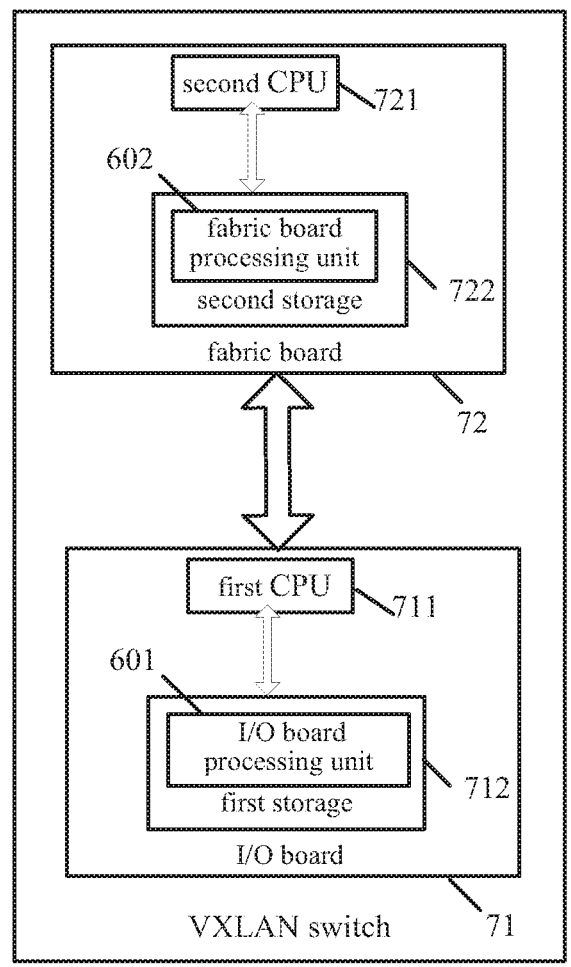
FIG. 7 is a diagram illustrating a hardware structure of a VXLAN switch according to various examples of the present disclosure.

FIG. 7 is a diagram illustrating a hardware structure of a VXLAN switch according to various examples of the present disclosure. As shown in FIG. 7, the hardware structure includes an I/O board 71 and a fabric board 72.

The I/O board 71 includes a first CPU 711 and a first storage 712.

The first storage 712 is to store the I/O board processing unit 601.

The first CPU 711 is to store a running control program of the I/O board processing unit 601, so as to control the I/O board processing unit 601 stored in the first storage 712 to perform the above operations of the I/O board processing unit 601, and the operations will not de described herein.

The I/O board 72 includes a second CPU 721 and a second storage 722.

The second storage 722 is to store the fabric board processing unit 602.

The second CPU 721 is to store a running control program of the fabric board processing unit 602, so as to control the fabric board processing unit 602 stored in the second storage 722 to perform the above operations of the fabric board processing unit 602, and the operations will not de described herein.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

The invention claimed is:

1. A method for forwarding a multicast data packet, comprising:
    receiving, by a first I/O board of a Virtual eXtensible Local Area Network (VXLAN) switch, the multicast data packet from a Virtual Local Area Network (VLAN);
    sending, by the first I/O board of the VXLAN switch, the multicast data packet to a fabric board of the VXLAN switch when at least one multicast group member port corresponding to the multicast data packet is a first virtual port, wherein, the first virtual port is a virtual port configured in advance for indicating that the fabric board continues to perform entry searching and multicast data packet forwarding;

receiving, by the fabric board of the VXLAN switch, the multicast data packet sent by the first I/O board;

determining, by the fabric board of the VXLAN switch, that layer 3 multicast forwarding is to be performed by the fabric board for the multicast data packet;

modifying, by the fabric board of the VXLAN switch, a source Media Access Control (MAC) address of the multicast data packet as a gateway MAC address of the VXLAN switch when a multicast group member port corresponding to the multicast data packet is a VXLAN tunnel port;

sending, by the fabric board of the VXLAN switch, the modified multicast data packet to a second I/O board corresponding to the multicast group member port on the VXLAN switch; and receiving, by the second I/O board on the VXLAN switch, the modified multicast data packet sent by the fabric board;

adding, by the second I/O board on the VXLAN switch, a VXLAN encapsulation to the multicast data packet; and forwarding, by the second I/O board on the VXLAN switch, the modified multicast data packet having the VXLAN encapsulation to a VXLAN.

2. The method of claim 1, wherein the multicast group member port corresponding to the multicast data packet is included in a layer 3 multicast group entry matching with the multicast data packet; and the method further comprises:

searching, by the first I/O board of the VXLAN switch, a local layer 3 multicast group table for the layer 3 multicast group entry matching with a destination IP address and a destination MAC address of the multicast data packet;

searching, by the fabric board of the VXLAN switch, a local layer 3 multicast group table for the layer 3 multicast group entry matching with the destination IP address and the destination MAC address of the multicast data packet.

3. The method of claim 1, wherein sending the multicast data packet to the fabric board of the VXLAN switch comprises:

adding, by the first I/O board of the VXLAN switch, a first internal encapsulation to the multicast data packet after removing the first VXLAN encapsulation, wherein the first internal encapsulation comprises:

a first destination chip identifier indicating the identifier of the first virtual chip, and a first destination port identifier indicating an identifier of a first virtual port;

when the first I/O board is connected to one fabric board, sending, by the first I/O board, the multicast data packet having the first internal encapsulation via an inner port connecting the first I/O board with the fabric board;

when the first I/O board is connected to multiple fabric boards, sending, by the first I/O board, the multicast data packet having the first internal encapsulation via one of the inner ports connecting the first I/O board with the fabric boards respectively.

4. The method of claim 3, wherein determining that layer 3 multicast forwarding is to be performed by the fabric board for the multicast data packet comprises:

determining, by the fabric board of the VXLAN switch, the first destination chip identifier and the first destination port identifier from a header of the first internal encapsulation;

removing, by the fabric board of the VXLAN switch, the first internal encapsulation from the multicast data packet having the first internal encapsulation if the determined first destination chip identifier is the identifier of the first virtual chip, and the first destination port identifier is the identifier of the first virtual port;

determining, by the fabric board of the VXLAN switch, that layer 3 multicast forwarding is to be performed by the fabric board for the multicast data packet if the destination MAC address of the multicast data packet is the multicast MAC address and the destination IP address of the multicast data packet is the multicast IP address.

5. The method of claim 1, wherein sending the modified multicast data packet to the second I/O board corresponding to the multicast group member port on the VXLAN switch comprises:

determining, by the fabric board of the VXLAN switch, a target egress port according to the multicast group member port;

selecting, by the fabric board of the VXLAN switch, an I/O board including the target egress port as the second I/O board corresponding to the multicast group member port;

adding, by the fabric board of the VXLAN switch, a second internal encapsulation to the modified multicast data packet, wherein the second internal encapsulation comprises a VXLAN tunnel encapsulation entry index corresponding to the multicast group member port and a VFI corresponding to the multicast group member port; and sending, by the fabric board of the VXLAN switch, the modified multicast data packet having the second internal encapsulation to the second I/O board.

6. The method of claim 5, wherein determining the target egress port according to the multicast group member port comprises:

finding, by the fabric board of the VXLAN switch, a locally stored next hop entry corresponding to a VXLAN tunnel associated with the multicast group member port;

determining, by the fabric board of the VXLAN switch, one next hop included in the next hop entry as a target next hop;

determining, by the fabric board of the VXLAN switch, a single physical port as the target egress port when an egress port corresponding to the target next hop is the single physical port;

determining, by the fabric board of the VXLAN switch, one physical port in a port group as the target egress port when the egress port corresponding to the target next hop is the port group formed by binding at least two physical ports.

7. The method of claim 5, wherein adding the VXLAN encapsulation to the modified multicast data packet and forwarding the modified multicast data packet having the VXLAN encapsulation to the VXLAN comprises:

determining, by the second I/O board on the VXLAN switch, the VXLAN tunnel encapsulation entry index and the VFI from a header of the second internal encapsulation;

removing, by the second I/O board on the VXLAN switch, the second internal encapsulation from the modified multicast data packet having the second internal encapsulation;

finding, by the second I/O board on the VXLAN switch, a locally stored VXLAN tunnel encapsulation entry corresponding to the VXLAN tunnel encapsulation entry index;

searching, by the second I/O board on the VXLAN switch, a preconfigured mapping relation between VFIs and VNIDs for a VNID corresponding to the determined VFI;

adding, by the second I/O board on the VXLAN switch, the VXLAN encapsulation to the modified multicast data packet according to the VXLAN tunnel encapsulation entry and the searched-out VNID; and sending, by the second I/O board on the VXLAN switch, the modified multicast data packet having the VXLAN encapsulation via an egress port in the found VXLAN tunnel encapsulation entry.

8. A VXLAN switch, comprising:
an I/O board processing unit, which is located at an I/O board of the VXLAN switch and configured to:
receive a multicast data packet from a VLAN;
send the multicast data packet to a fabric board of the VXLAN switch when at least one multicast group member port corresponding to the multicast data packet is a first virtual port, wherein, the first virtual port is a virtual port configured in advance for indicating that the fabric board continues to perform entry searching and multicast data packet forwarding; and
a fabric board processing unit, which is located at the fabric board of the VXLAN switch and configured to
receive the multicast data packet sent by the I/O board,
determine that layer 3 multicast forwarding is to be performed by the fabric board for the multicast data packet;
modify a source MAC address of the multicast data packet as a gateway MAC address of the VXLAN switch when a multicast group member port corresponding to the multicast data packet is a VXLAN tunnel port; and
send the modified multicast data packet to an I/O board corresponding to the multicast group member port on the VXLAN switch,
wherein, the I/O board processing unit is further configured to:
receive the modified multicast data packet from the fabric board;
add a VXLAN encapsulation to the modified multicast data packet received from the fabric board; and
forward the modified multicast data packet having the VXLAN encapsulation to a VXLAN.

9. The VXLAN switch of claim 8, wherein
the multicast group member port corresponding to the multicast data packet is included in a layer 3 multicast group entry matching with the multicast data packet; and
the I/O board processing unit is further to search a local layer 3 multicast group table for the layer 3 multicast group entry matching with a destination IP address and a destination MAC address of the multicast data packet;
the fabric board processing unit is further to search the local layer 3 multicast group table for the layer 3 multicast group entry matching with the destination IP address and the destination MAC address of the multicast data packet.

10. The VXLAN switch of claim 8, wherein the I/O board processing unit is configured to send the multicast data packet to the fabric board of the VXLAN switch through a process of:
adding a first internal encapsulation to the multicast data packet after removing the first VXLAN encapsulation, wherein the first internal encapsulation comprises
a first destination chip identifier indicating an identifier of a first virtual chip, and
a first destination port identifier indicating an identifier of the first virtual port;
when the I/O board is connected to one fabric board, sending the multicast data packet having the first internal encapsulation via an inner port connecting the I/O board with the fabric board;
when the I/O board is connected to multiple fabric boards, sending the multicast data packet having the first internal encapsulation via one of the inner ports connecting the I/O board with the fabric boards respectively.

11. The VXLAN switch of claim 10, wherein the fabric board processing unit is configured to determine that layer 3 multicast forwarding is to be performed by the fabric board for the multicast data packet through a process of:
determining the first destination chip identifier and the first destination port identifier from a header of the first internal encapsulation;
removing the first internal encapsulation from the multicast data packet having the first internal encapsulation if the determined first destination chip identifier is the identifier of the first virtual chip, and the first destination port identifier is the identifier of the first virtual port;
determining that layer 3 multicast forwarding is to be performed by the fabric board for the multicast data packet if a destination MAC address of the multicast data packet is a multicast MAC address and a destination IP address of the multicast data packet is a multicast IP address.

12. The VXLAN switch of claim 8, wherein the fabric board processing unit is configured to send the modified multicast data packet to the I/O board corresponding to the multicast group member port on the VXLAN switch through a process of:
determining a target egress port according to the multicast group member port;
selecting an I/O board including the target egress port as the I/O board corresponding to the multicast group member port;
adding a second internal encapsulation to the modified multicast data packet, wherein the second internal encapsulation comprises an VXLAN tunnel encapsulation entry index corresponding to the multicast group member port and a VFI corresponding to the multicast group member port; and
sending the modified multicast data packet having the second internal encapsulation to the I/O board including the target egress port.

13. The VXLAN switch of claim 12, wherein the fabric board processing unit is configured to determine the target egress port according to the multicast group member port through a process of:
finding a locally stored next hop entry corresponding to a VXLAN tunnel associated with the multicast group member port;
determining one next hop included in the next hop entry as a target next hop;

determining a single physical port as the target egress port when the egress port corresponding to the target next hop is the single physical port;

determining one physical port in a port group as the target egress port when the egress port corresponding to the target next hop is the port group formed by binding at least two physical ports.

14. The VXLAN switch of claim 12, wherein the I/O board processing unit is configured to add the VXLAN encapsulation to the modified multicast data packet and forward the modified multicast data packet having the VXLAN encapsulation to the VXLAN through a process of:

determining the VXLAN tunnel encapsulation entry index and the VFI from a header of the second internal encapsulation;

removing the second internal encapsulation from the modified multicast data packet having the second internal encapsulation;

finding a locally stored VXLAN tunnel encapsulation entry corresponding to the VXLAN tunnel encapsulation entry index;

searching a preconfigured mapping relation between VFIs and VNIDs for a VNID corresponding to the determined VFI;

adding the VXLAN encapsulation to the modified multicast data packet according to the VXLAN tunnel encapsulation entry and the searched-out VNID; and sending the modified multicast data packet having the VXLAN encapsulation via an egress port in the found VXLAN tunnel encapsulation entry.

15. An apparatus for forwarding a multicast data packet, comprising:

an I/O board with:
a first processor; and
a first memory for storing instructions executable by the first processor,
wherein the first processor is configured to perform steps of:
receiving a multicast data packet from a Virtual Local Area Network (VLAN); and
sending the multicast data packet to a fabric board of a VXLAN switch when at least one multicast group member port corresponding to the multicast data packet is a first virtual port, wherein, the first virtual port is a virtual port configured in advance for indicating that the fabric board continues to perform entry searching and multicast data packet forwarding, the fabric board with:
a second processor; and
a second memory for storing instructions executable by the second processor,
wherein the second processor is configured to perform steps of:
receiving the multicast data packet sent by the I/O board;
determining that layer 3 multicast forwarding is to be performed by the fabric board for the multicast data packet;
modifying a source Media Access Control (MAC) address of the multicast data packet as a gateway MAC address of the VXLAN switch when a multicast group member port corresponding to the multicast data packet is a VXLAN tunnel port;
sending the modified multicast data packet to the I/O board corresponding to the multicast group member port on the VXLAN switch;

wherein the first processor is further adapted to perform steps of:
receiving the multicast data packet sent by the fabric board;
adding a VXLAN encapsulation to the received multicast data packet; and
forwarding the multicast data packet having the VXLAN encapsulation to a VXLAN.

* * * * *